United States Patent [19]
Notta

[11] Patent Number: 5,340,195
[45] Date of Patent: Aug. 23, 1994

[54] VEHICLE SEAT ASSEMBLY HINGE AND METHOD OF ASSEMBLY

[75] Inventor: Adolf Notta, Toronto, Canada

[73] Assignee: Bertrand Faure Ltd., Mississauga, Canada

[21] Appl. No.: 946,127

[22] Filed: Sep. 17, 1992

[30] Foreign Application Priority Data

Apr. 3, 1992 [CA] Canada ................................. 2065126

[51] Int. Cl.⁵ ............................................. B60N 2/02
[52] U.S. Cl. ................................. 297/354.1; 16/380; 29/505; 29/522.1; 297/463
[58] Field of Search ................... 297/354, 355, 354.1, 297/463; 29/505, 522.1; 16/386, 387, 380

[56] References Cited

U.S. PATENT DOCUMENTS

| | | | |
|---|---|---|---|
| 990,581 | 4/1911 | Neider | 29/522.1 X |
| 1,511,822 | 10/1924 | Belcher | 29/505 |
| 4,114,670 | 9/1978 | Akashi et al. | 29/522.1 X |
| 4,182,193 | 1/1980 | Schultz, Jr. | 29/522.1 X |
| 4,322,112 | 3/1982 | Berghaus et al. | 297/355 X |
| 4,875,735 | 10/1989 | Moyer et al. | 297/366 X |
| 4,974,274 | 12/1990 | Compton et al. | 29/505 X |
| 5,099,562 | 3/1992 | Loughran | 16/380 X |
| 5,212,868 | 5/1993 | Morris et al. | 29/522.1 X |

FOREIGN PATENT DOCUMENTS

0289522 11/1989 Japan ..................................... 29/505

*Primary Examiner*—Lloyd A. Gall
*Attorney, Agent, or Firm*—Patrick J. Hofbauer

[57] ABSTRACT

A vehicle seat hinge assembly having first and second generally opposed and parallel hinge plates rigidly connected in spaced relation to one another, and a central third hinge plate partially sandwiched between the first and second hinge plates is disclosed, together with a process for assembling the hinge assembly. The third hinge plate is connected in hinged relation to the first and second hinge plates by a pivot pin, which pin has a longitudinal axis and first and second shoulder portions extending in opposite axial directions from a centrally disposed annular hub portion, which shoulder portions each contain an amount of plastically deformable shoulder material. The shoulder material is plastically deformed during assembly into keyway slots formed in mounting openings provided in each of the first and second hinge plates, so that the deformed material prevents rotation of the pivot pin relative to the first and second hinge plates, so that the pivot pin is rotationally and axially fixed relative to the first and second hinge plates without the need for supplementary clips or other attachment mechanisms.

11 Claims, 4 Drawing Sheets

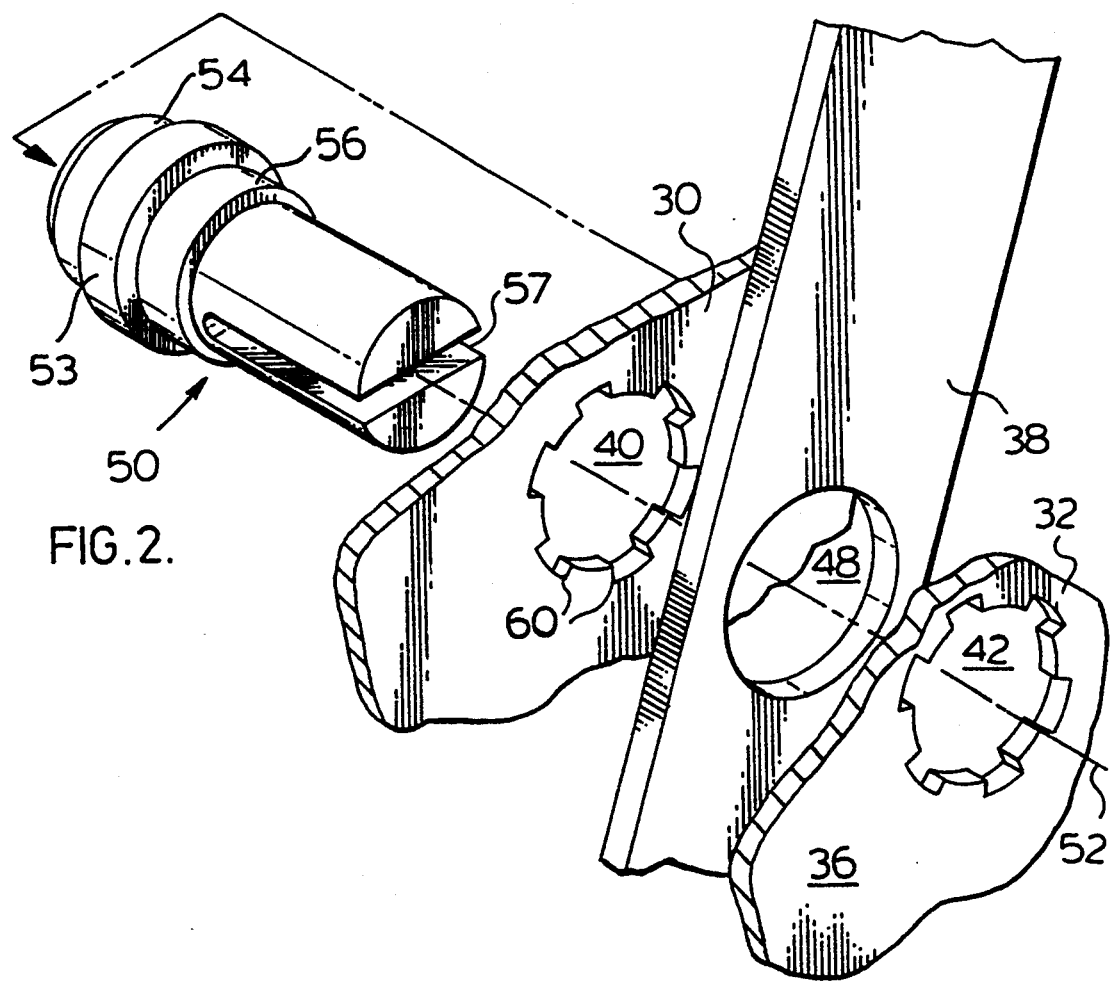
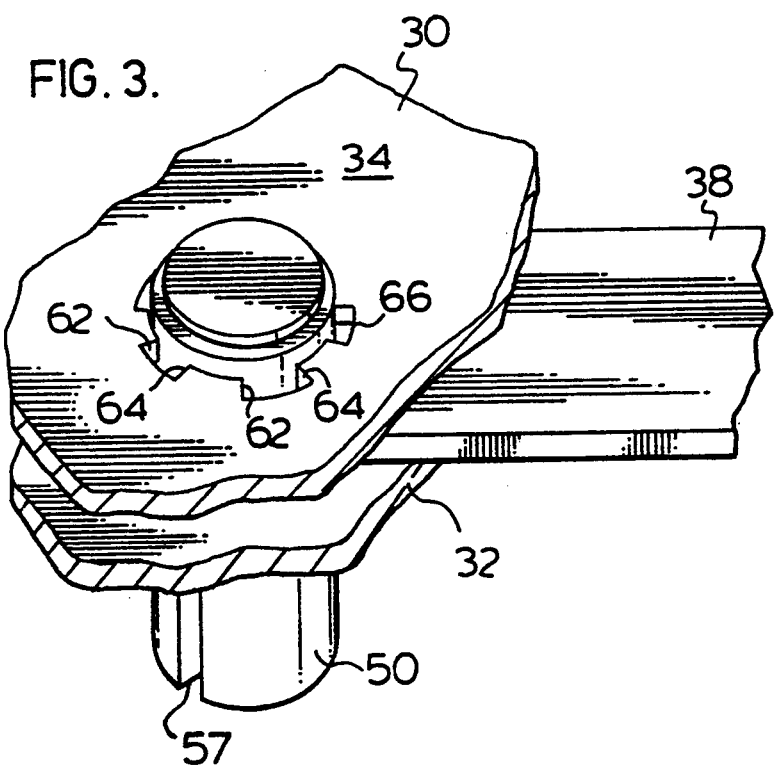

VEHICLE SEAT ASSEMBLY HINGE AND METHOD OF ASSEMBLY

FIELD OF THE INVENTION

The present invention relates to hinges and more particularly to pivot pins for inclusion in hinges. Specifically, a novel construction of a pivot pin hinge assembly for use in a vehicle seat and a related method for assembling such a pivot pin hinge assembly are taught.

BACKGROUND OF THE INVENTION

In a vehicle seat assembly hinge it is common to have one hinge plate, which is typically connected to a seat back member, sandwiched between and connected in hinged relation to a pair of generally opposed hinged plates, which are typically connected to a seat cushion member. Other similar arrangements may also be used. It is well known to connect the single hinge plate to the pair of hinge plates in hinged relation by a pivot pin that is received in close-fitting operative engagement in aligned openings in all of the hinge members. The pivot pin is typically connected in rigid and generally unmoving relation to the pair of hinge plates and the remaining sandwiched hinge plate rotates about an annular hub portion of the pivot pin. It is also possible to have the pivot pin rigidly connected to the sandwiched hinge plate and rotate with respect to the pair of hinge plates.

It is important that the pivot pin be rotationally and axially fixed with respect to the hinge plate or plates it is connected to, such that there is little or no rotational movement and also little or no axially directed movement of the pivot pin with respect to the plate or plates. Further, it is important that the pivot pin remains rotationally fixed and axially fixed as described above for an extended period of time, preferably in the order of 75,000 cycles of operation of the vehicle seat assembly hinge. It is well known that if the pivot pin becomes loose, there will be a general looseness in the vehicle seat assembly hinge, which in turn could cause an increased and generally unacceptable amount of chuck in the seat back member, or could even cause a malfunction of the hinge.

There are several well known methods of connecting the pivot pin in rigid and unmoving relation to the pair of hinge plates connected to the seat cushion member, which will be discussed henceforth.

One method of connecting the pivot pin in generally rigid and unmoving relation to the pair of hinge plates as aforesaid involves providing a pair of flats on the pivot pin and having corresponding flat surfaces on an opening in an at least one of the pair of hinge plates, which pair of flats and corresponding flat surfaces preclude the pivot pin from rotational movement with respect to the outer hinge plates. This method is fully described and detailed in U.S. Pat. No. 4,875,735 to Moyer et al., which patent is incorporated herein by reference. Machining of the flats is, however, a costly process step, and normal manufacturing tolerances result in clearances between the flats and the corresponding flat surfaces on the opening(s) of the hinge plate(s), such that some undesired rotation of the pivot pin is typically encountered.

Another method is known as "C" clipping. A portion of the pivot pin exterior to the outermost hinge plates has a circumferential groove machined therein at one or both ends thereof. After the pivot pin is inserted into the openings in the hinge plates, the "C" clip is inserted into the circumferential groove or grooves, thereby retaining and precluding axially directed movement of the pivot pin. However, the pivot pin is not necessarily held tightly against the outer surfaces of the respective two outer hinge plates, such that the "C" clip does not preclude rotational movement of the pivot pin. Moreover, use of a "C" clip to retain a pivot pin in this general manner is costly because it involves one or two extra parts, (i.e., the "C" clips) an extra manufacturing step to machine the circumferential rings on the pivot pin, and also an extra assembly step to attach the "C" clip or clips. An example of "C" clipping can be seen in U.S. Pat. No. 4,707,010 issued to Croft and Hiscox, which patent is incorporated herein by reference.

Another method of connecting the pivot pin in generally rigid and unmoving relation to the outer plates is known as orbital staking, which is essentially simple riveting. In orbital staking, the ends of the pivot pin extend a small amount beyond the outer surfaces of the outermost hinge plates. These ends of the pivot pin are compressed by a hydraulic press such that they flare outwardly and over the outer surface of the respective hinge plate until the flared portion comes into intimate and tight contact with that outer surface. The friction between each flared portion and the outer surfaces of the hinge plates precludes the pivot pin from moving rotationally. The flared portions preclude the pivot pin from axial movement. The pin generally remains tightly engaged with the hinge plates in the short term. However, it has been found that pins secured by orbital staking do not stand up in long term service, as they tend to loosen, whereafter they can no longer resist rotational movement.

A further method, which is similar to orbital staking, is known as ring staking. Ring staking involves the plastic deformation of the ends of plastically deformable pivot pin material into the very narrow annular gap between the pivot pin and the surface of the opening in the hinge plates. This deformed pivot pin material is pressed under great force into the annular gap, thus causing extremely high friction between the deformed material and the hinge plates, and between the deformed material and the pivot pin. Pivot pins secured by ring staking are generally unmovable within the hinge plates with respect to rotational movement and also with respect to axial movement, over the short term. Ring staking produces somewhat better results than orbital staking with respect to precluding rotational movement over the long term, but still does not stand up in long term service as well as is required in the automotive industry. It has been found that after about 25,000 cycles of use, a pivot pin secured in this manner becomes worn and loose, and is apt to allow rotational movement of the pivot pin. It has further been shown that shearing of the pivot pin may readily occur at about 50,000 to about 55,000 cycles of use.

It is therefore desirable to produce a method of securing a pivot pin in a hinge plate such that rotational movement of the pin with respect to the hinge plate is precluded over the long term for at least 75,000 cycles.

It is an object of the present invention to produce a pivot pin and an improved vehicle seat assembly hinge containing such a pivot pin, that substantially precludes axially directed movement and rotational movement.

It is another object of the invention to produce a vehicle seat assembly hinge having a pivot pin that remains axially tight and rotationally unmovable therein for about 75,000 cycles or more.

It is a further object of the invention to produce a pivot pin and a vehicle seat assembly hinge that are relatively inexpensive to manufacture and easy to assemble.

Other objects, features and characteristics of the present invention, as well as methods of operation and functions of the related elements of the structure, and the combination of parts and economies of manufacture, will become more apparent upon consideration of the following detailed description and the appended claims with reference to the accompanying drawings, all of which form a part of this specification.

SUMMARY OF THE INVENTION

An improved vehicle seat assembly hinge is disclosed. The vehicle seat assembly hinge has first and second generally opposed and parallel hinge plates rigidly connected in spaced relation to one another, the first and second hinge plates having respective outer surfaces. There is a central third hinge plate partially sandwiched between the first and second hinge plates. The first, second and third hinge plates have respective first, second and third openings therein. The third hinge plate is connected in hinged relation to the first and second hinge plates by a pivot pin, the pivot pin having a longitudinal axis, a centrally disposed annular hub portion, first and second shoulder portions extending in each opposite directions from the hub portion. The first, third and second openings in the first, third and second hinge plates are aligned with one another so as to respectively receive in close-fitting operative engagement one each of the first shoulder portion, the annular hub portion and the second shoulder portion. The improvement in the vehicle seat assembly hinge comprises at least one of the first and second openings defining at least one keyway slot extending generally outwardly beyond the perimeter of the opening; and, the pivot pin having an amount of plastically deformable pin material adjacent at least one of the openings, at least a portion of the amount of plastically deformable material being plastically deformed into the at least one keyway slot in intimate and rotationally interfering relation between the pivot pin and the opening, whereby the pivot pin is rotationally fixed relative to the first and second hinge plates and the pivot pin is axially fixed relative to the first and second hinge plates.

Alternatively, the first and second openings and the respective received shoulder portions of the pivot pin are non-circular in cross-section, and are of similar shape, with the shoulder portions being slightly smaller and located internally to the respective openings. The pivot pin has an amount of plastically deformable pin material adjacent at least one of the openings, at least a portion of the amount of plastically deformable material being plastically deformed into the space between the shoulder portions of the pivot pin and the respective openings in intimate and rotationally interfering relation therebetween, whereby said pivot pin is rotationally fixed relative to the first and second hinge plates and the pivot pin is axially fixed relative to the first and second hinge plates.

A method of assembling an improved vehicle seat assembly hinge is also disclosed. The vehicle seat assembly hinge has first and second generally opposed and parallel hinge plates rigidly connected in spaced relation to one another, the first and second hinge plates having respective outer surfaces. There is a central third hinge plate sandwiched between the first and second hinge plates. The first, second and third hinge plates having respective first, second and third openings therein. The third hinge plate is connected in hinged relation to the first and second hinge plates by a pivot pin, the pivot pin having a longitudinal axis, a centrally disposed annular hub portion, first and second shoulder portions extending in opposite axial directions from the hub portion. The first, third and second openings in the first, third and second hinge plates are aligned with one another so as to respectively receive in close-fitting operative engagement one each of the first shoulder portion, the annular hub portion and the second shoulder portion. The method comprises the steps of placing said pivot pin into said first hinge plate such that said first shoulder portion is received by said first opening;

placing said third hinge plate over said first hinge plate such that said annular hub portion is received by said third opening;

placing said second hinge plate over said third hinge plate such that said second shoulder portion is received by said second opening;

said shoulder portions each having an amount of plastically deformable pin material;

correctly axially positioning said pivot pin at a predetermined longitudinal position within said openings with said amount of plastically deformable shoulder material adjacent the respective ones of said first and second openings;

plastically deforming said shoulder material, only, into said keyway slots in rotationally interfering register between said pivot pin and said first and second hinge plates, whereby said pivot pin is rotationally fixed relative to said first and second hinge plates and said pivot pin is axially fixed in opposite axial directions relative to said first and second hinge plates.

Figure 1:
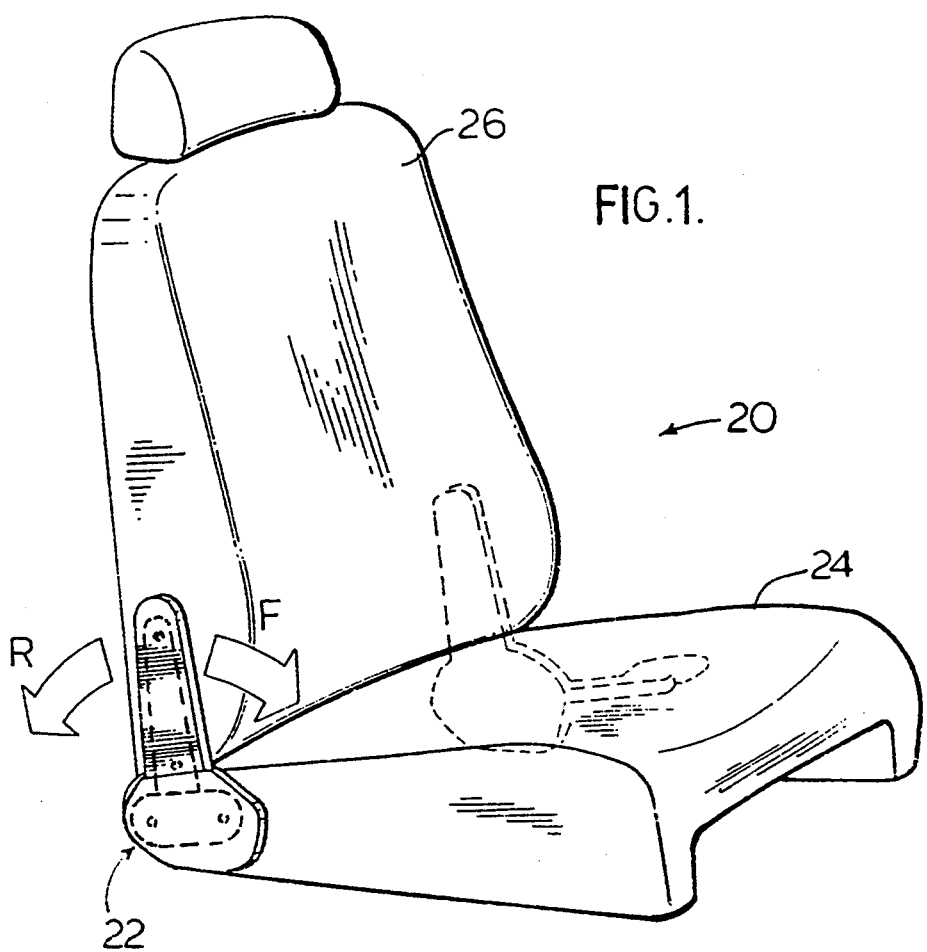
FIG. 1 is a perspective view of a vehicle seat assembly showing a vehicle seat assembly hinge according to the present invention installed therein on each side of the seat.
Figure 7:
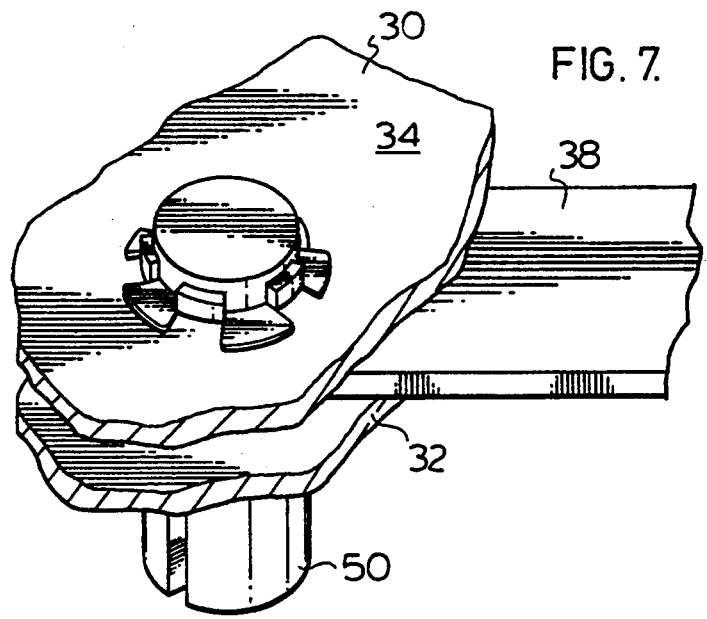
Figure 4:
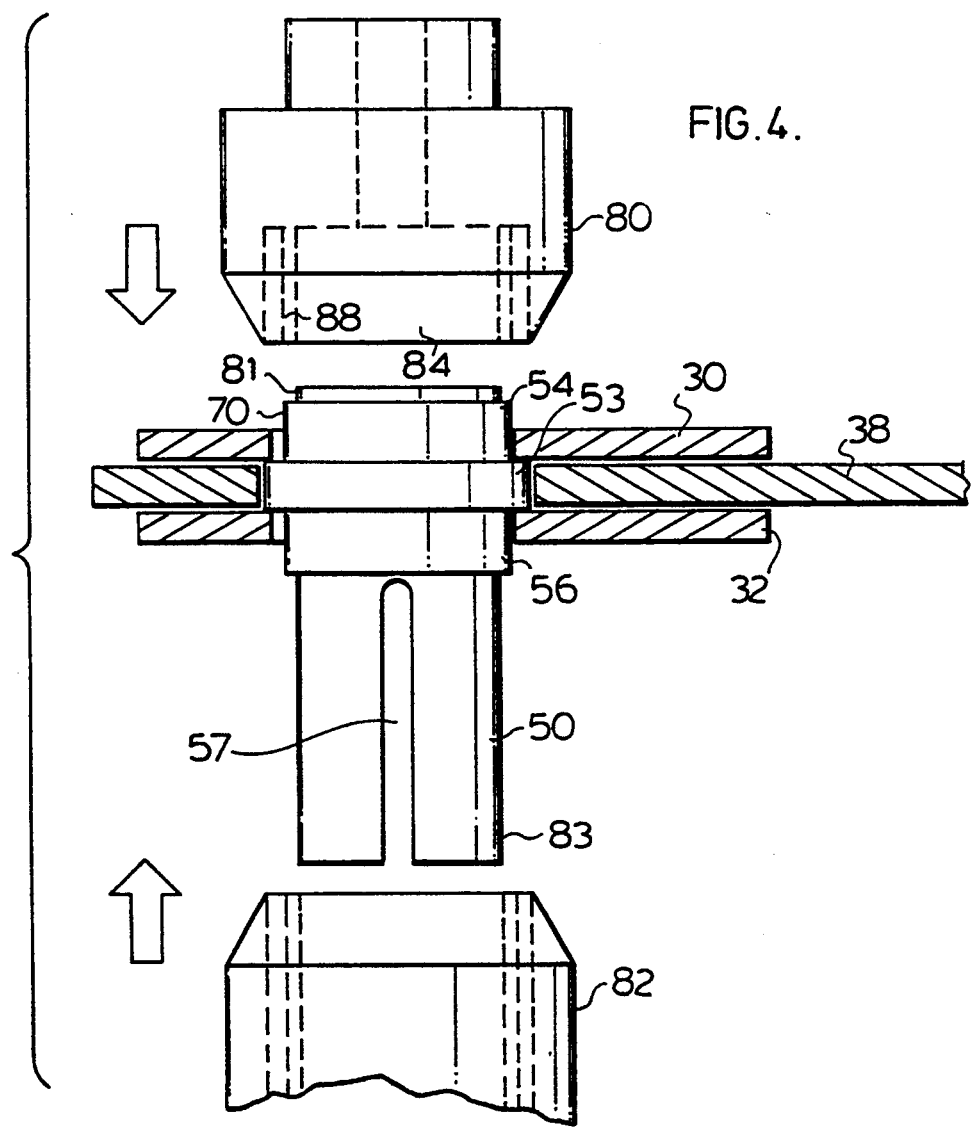
Figure 6:
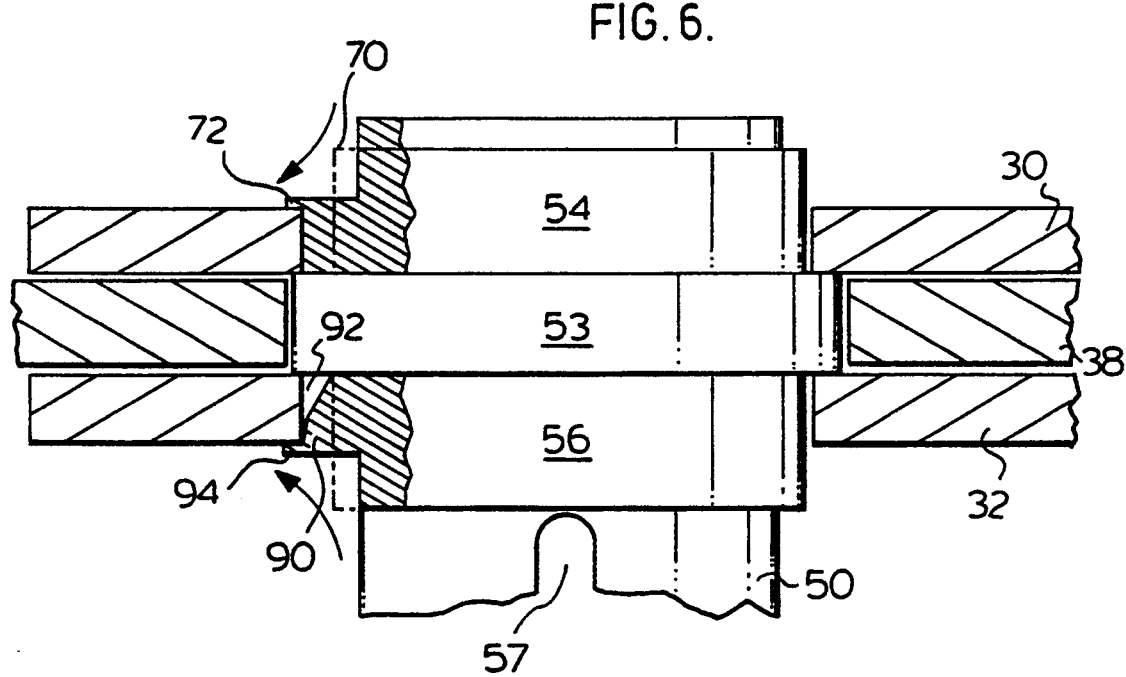

Figure is an exploded perspective view of part of one of the seat assembly hinges of FIG. 1, with the pivot pin of the hinge assembly about to be inserted into first, third and second hinge plates;

Figure is a perspective view from the opposite side of the hinge assembly shown in FIG. 2, with the pivot pin correctly placed in the first, third and second hinge plates;

Figure is a partial cut-away view of the hinge assembly of FIG. 3 with the pivot pin shown in full from the side, further showing a pair of die rams about to engage the pivot pin in order to deform a portion thereof;

Figure is a bottom perspective view of the top die ram of FIG. 4;

Figure is a cross-sectional view of the pivot pin and hinge plate showing the deformed pivot pin material and also showing in broken outline the same material of the pivot pin before deformation; and, Figure is a partial perspective view of the hinge plates and pivot pin of FIG. 6 after deformation of the pivot pin by the die rams of FIG. 4.

DETAILED DESCRIPTION OF A PREFERRED EMBODIMENT

Reference will now be made to FIG. 1 which shows a vehicle seat assembly 20 having the improved vehicle seat assembly hinge 22 of the present invention installed on both sides of the vehicle seat (but shown only on the right side thereof). The vehicle seat assembly 20 comprises a seat cushion 24 and a seatback member 26. The snap-on trim cover that protects the vehicle seat assembly hinge 22 has been removed for the sake of clarity of illustration.

Reference will now be made to FIGS. 2 through 7 which show details of the seat assembly hinge 22 and of a novel die ram for use in the production of the hinge assembly.

The vehicle seat assembly hinge has first 30 and second 32 generally opposed and parallel hinge plates rigidly connected in spaced relation to one another. Typically, known fasteners, such as rivets or the like (not shown) are used to fasten the first 30 and second 32 hinge plates together in spaced relation. The first 30 and second 32 hinge plates have respective outer surfaces 34, 36. There is also provided a central third hinge plate 38 partially sandwiched between the first 30 and the second 32 hinge plates. The first 30 and second 32 hinge plates are associated with a seat cushion 24 and the third hinge plate 38 is associated with a seat back member 26. The first 30, second 32 and third 38 hinge plates have respective first 40, second 42 and third 48 openings therein. The first 40, second 42 and third 48 openings in the first 30, second 32 and third 38 hinge plates respectively are generally circular in cross-section. The third hinge plate 38 is connected in hinged relation to the first 30 and second 32 hinge plates by a pivot pin 50.

The pivot pin 50 is the main hinge pivot for the vehicle seat assembly hinge 22 and is also generally circular in cross-section in the preferred embodiment illustrated. The pivot pin 50 has a longitudinal axis 52, a centrally disposed annular hub portion 53, first 54 and second 56 shoulder portions extending in opposite axial directions from the hub portion 53 and first 81 and second 83 end portions. The second end portion 83 has a slot 57 therein for receiving one end of the vehicle seat return spring (not shown). The first 40, third 48 and a second 42 openings in the first 30, third 38 and second 32 hinge plates, respectively, are aligned with one another so as to respectively receive in close fitting operative engagement one each of the first shoulder portion 54, the annular hub portion 53 and the second shoulder portion 56.

Preferably both, but at least one, of the first 40 and second 42 openings define at least one keyway slot 60 extending generally outwardly beyond the perimeter of the respective openings. In the preferred embodiment, the first 40 and second 42 openings define six mutually circumferentially evenly spaced keyway slots 60, with each of these keyway slots 60 extending generally outwardly beyond the perimeter of the openings 40, 42. As can be seen, pairs of the keyway slots 60 are arranged in mutually diametrically opposed paired relation around the perimeter of the first 40 and second 42 openings. The keyway slots 60 preferably comprise, as shown, generally rectangularly shaped slots extending radially outwardly from the perimeter with a first side 62, a second side 64 and an end 66.

The pivot pin 50 has an amount of plastically deformable pin material 70 adjacent at least one of the openings. At least a portion of the amount of plastically deformable material 70 is plastically deformed into the keyway slots 60 in a manner that will be described henceforth. It is preferable to deform the plastically deformable material 70 into all of the keyway slots 60, however, deformation of the plastically deformable material 70 into only some of the keyway slots 60 is generally acceptable.

The plastically deformable material 70 is plastically deformed into the keyway slot 60 in intimate and rotationally interfering relation between the pivot pin 50 and the respective first 40 and second 42 openings. The plastically deformable material 70 therein wedges the pivot pin 50 in rotationally fixed relation relative to the first 30 and second 32 hinge plates and in axially fixed relation relative to the first 30 and second 32 hinge plates.

Preferably, the plastically deformable material 70 is further locally plastically deformed generally immediately around the keyway slot 60 to thereby form a lip portion 72 that engages in radially overlapping relation with a corresponding localized portion of the outer surfaces 34, 36 surrounding each of the keyway slots 60. While this overlapping plastically deformable material 70 would not specifically serve to provide a great amount of rotational resistance to movement of the pivot pin 50 within the first 40 and second 42 openings, it does substantially preclude axially directed movement of the pivot pin 50 under normal operative loading so as to retain the pivot pin 50 within the seat assembly hinge 22.

The method of assembling the improved vehicle seat assembly hinge of the present invention will now be described. The first 30, third 38 and second 32 hinge plates, respectively, are introduced to one another in sandwiched relation as best shown in FIG. 6, such that the first 40, third 48 and second 42 openings are generally aligned with one another. The first hinge plate 30 is placed into a jig (not shown) with the outer surface 34 thereof facing downwardly into the jig. The required fasteners, such as rivets, and the pivot pin 50, are so placed into appropriate openings in the first hinge plate 30, with the first opening 40 receiving the first shoulder portion 54 of the pivot pin 50. The annular hub portion 53 is of a greater diameter than the first opening 40, thus retaining the pivot pin 50 in proper position. The third hinge plate 38 is placed over the first hinge plate 30 with the third opening 48 receiving the annular hub portion 53. The second hinge plate 32 is then placed overtop the third hinge plate 38 such that the second shoulder portion 56 of the pivot pin 50 is received by the second opening 32, and the fasteners are received as appropriate.

The pivot pin 50 has an amount of plastically deformable pin material 70 adjacent the first 40 and second 42 openings. It is possible that the plastically deformable pin material 70 is adjacent only one of the first 40 and second 42 openings, but preferably adjacent both. The plastically deformable pin material 70 is part of the shoulder portions 54 and 56. The first shoulder portion 54 is located in register with the first opening 40 and the second shoulder portion 56 is located in register with the second opening 42 in the second hinge plate 32. Both of the first 40 and second 42 openings include at least one keyway slot 60 extending generally outwardly beyond the perimeter of each opening. In the preferred embodiment, there are six keyway slots 60 spaced evenly around the perimeter of the first 40 and second 42 openings.

The pivot pin 50 is correctly axially positioned by the jig at a predetermined longitudinal position within the first 40, third 48 and second 42 openings, with the amount of plastically deformable pin material of the first shoulder portion 54 located adjacent the first opening 40 and the plastically deformable pin material 70 at second shoulder portion 56 located adjacent the second opening 42.

Figure 5:
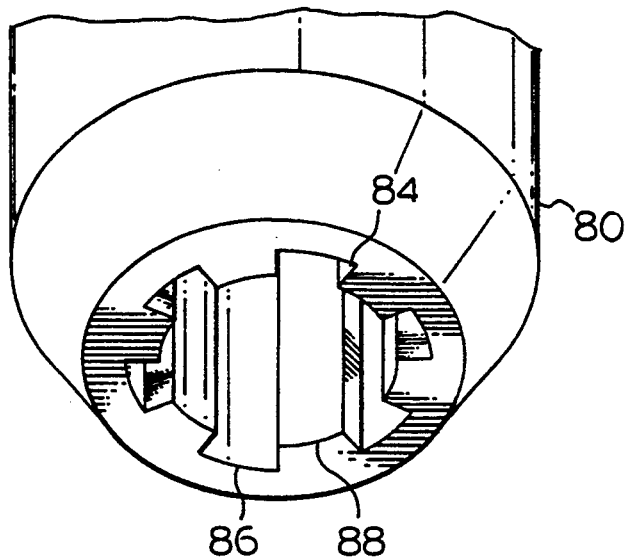

As can be best seen in FIGS. 4 and 5 there is a first die ram 80 that fits over the first end portion 81 of the pivot pin 50 and a second die ram 82 that fits over the second end portion 83 of the pivot pin 50. Each of the die rams 80, 82 have a central opening 84 therein for receiving the respective end portions 81, 83 of the pivot pin 50. The central opening 84 has an outside diameter 86 that is slightly larger than the first 54 and second 56 shoulder portions of the pivot pin 50. Extending inwardly from the outside diameter 86 of the central openings 84 are six evenly spaced intrusions 88. The distance between opposite intrusions 88 is slightly larger than the end portions 81, 83 of the pivot pin 50 and is slightly smaller than the shoulder portions 54, 56 of the pivot pin 50. The intrusions 88 are used to deform the deformable material 70 of the shoulder portions 54, 56 into the keyways 60 of the first 30 and second 32 end plates.

The rams 80, 82 are fit over the respective end portions 81, 83 of the pivot pin 50 and the six intrusions 88 are aligned with the keyways 60. Typically, the intrusions 88 do not enter the keyways 60, so the intrusions 88 may be wider, the same width, or narrower than the keyways 60. Preferably, they are slightly wider so as to ensure that a proper amount of deformable material of the shoulder portions 54, 56 is deformed into the keyways 60. Alternatively, it is possible that the intrusions 88 could enter the keyways 60. To do this, the intrusions 88 must be smaller in cross section than the respective keyways 60 and also they must protrude outwardly from the rams 80, 82.

As can be best seen in FIG. 6, the plastically deformable material 70 on the shoulder portions 54, 56 -- shown in ghost outline before deformation -- deform into the keyway slots 60 so as to form protrusions 90 therein. The protrusions 90 do not necessarily completely fill the keyway slots 60, but most likely leave a gap 92. The protrusions 90 do however, come into very tight contact with the three separate surfaces of the keyway slots 60. Preferably, but not necessarily, the plastically deformed material 70 extends above the outer surface of the respective first 30 and second 32 hinge plates and also extends outwardly over the outer surfaces thereof so as to form flanges 94 at each of the keyway slots 60. These flanges 94 help preclude axially directed movement of the pivot pin 50, in both opposite axial directions.

Due to the tight fit of the protrusions 90 within the keyway slots 60, the plastically deformed pin material 70 that forms the protrusions 90 is in rotationally interfering register with the first 30 and second 32 hinge plates. The pivot pin 50 is thereby rotationally fixed. Further, due to the tight fit of the protrusions 90, the pivot pin 50 is axially fixed in opposite axial directions.

In an alternative embodiment, openings in the first and second hinge plates would have four orthogonally spaced keyway slots therein and the die rams would have correspondingly four orthogonally spaced intrusions.

In a further alternative embodiment, the openings in the first and second hinge plates may be square in cross-section, and the shoulder portions of the pivot pin be of a corresponding square shape. The plastically deformable material on the pivot pin would be deformed into the space between the shoulders of the pivot pin and the openings of the first and second hinge plates in a manner essentially the same as that described above. Plastically deforming the pin material into this space would cause rotationally interfering register between the pivot pin and the first and second hinge plates.

I claim:

1. In an improved vehicle seat assembly hinge having first and second generally opposed and parallel hinge plates rigidly connected in spaced relation to one another, said first and second hinge plates having respective outer surfaces, and a central third hinge plate partially sandwiched between said first and second hinge plates, said first, second and third hinge plate having respective first, second and third openings therein, said third hinge plate connected in hinged relation to said first and second hinge plates by a pivot pin, said pivot pin having a longitudinal axis and axially opposed first and second ends, a centrally disposed annular hub portion, first and second shoulder portions extending in opposite axial directions from said hub portion toward but not extending to said first and second ends, said first, third and second openings being aligned with one another so as to respectively receive in close-fitting operative engagement one each of said first shoulder portion, said annular hub portion and said second shoulder portion, wherein the improvement comprises:

said first and second openings each defining at least one keyway slot extending generally outwardly beyond the perimeter of said opening; and, each of said shoulder portions having an amount of plastically deformable shoulder material adjacent the respective one of said openings, with a portion of said amount of plastically deformable shoulder material, only, being plastically deformed into the respective ones of said at least one keyway slot in intimate and rotationally interfering relation between said pivot pin and said opening, whereby said pivot pin is rotationally fixed relative to said first and second hinge plates and said pivot pin is axially fixed relative to said first and second hinge plates.

2. The improvement according to claim 1, wherein said shoulder portions and said first, second and third openings in said first, second and third hinge plates respectively are generally circular in cross-section.

3. The improvement according to claim 2, wherein said first and second openings each define a plurality of mutually circumferentially spaced keyway slots extending generally outwardly beyond the perimeter of each of said openings.

4. The improvement according to claim 3, wherein pairs of said keyway slots are arranged in mutually diametrically opposed paired relation around the perimeter of each of said openings.

5. The improvement according to claim 4, wherein said openings each define at least four spaced keyway slots.

6. The improvement according to claim 5, wherein said keyway slots comprise generally rectangularly shaped slots extending radially outwardly from said perimeter.

7. The improvement according to claim 6, wherein said plastically deformable material is further locally plastically deformed generally immediately around said keyway slots to thereby engage in radially overlapping relation with a correspondingly localized portion of said outer surface surrounding each of said keyway slots.

8. The improvement according to claim 7, wherein said pivot pin is a main hinge pivot and said first and second hinge plates are associated with a seat cushion and said third hinge plate is associated with a seatback member.

9. In an improved vehicle seat assembly hinge having first and second generally opposed and parallel hinge plates rigidly connected in spaced relation to one another, said first and second hinge plates having respective outer surfaces, and a central third hinge plate sandwiched between said first and second hinge plates, said first, second and third hinge plate having respective first, second and third openings therein, said third hinge plate connected in hinged relation to said first and second hinge plates by a pivot pin, said pivot pin having a longitudinal axis and axially opposed first and second ends, a centrally disposed annular hub portion, first and second shoulder portions extending in opposite axial directions from said hub portion toward but not extending to said first and second ends, said first, third and second openings being aligned with one another so as to respectively receive in close-fitting operative engagement one each of said first shoulder portion, said annular hub portion and said second shoulder portion, wherein the improvement comprises:

said first and second openings and said received shoulder portions of said pivot pin being non-circular in cross-section;

each of said shoulder portions having an amount of plastically deformable shoulder material adjacent the respective one of said openings, with a portion of said amount of plastically deformable shoulder material, only, being plastically deformed into the respective space between the shoulder portions of the pivot pin and the respective openings in intimate and rotationally interfering relation therebetween, whereby said pivot pin is rotationally fixed relative to said first and second hinge plates and said pivot pin is axially fixed in opposite axial directions relative to said first and second hinge plates.

10. A method of assembling an improved vehicle seat assembly hinge having first and second generally opposed and parallel hinge plates rigidly connected in spaced relation to one another, said first and second hinge plates having respective outer surfaces, and a central third hinge plate partially sandwiched between said first and second hinge plates, said first, second and third hinge plate having respective first, second and third openings, said first and second openings defining one or more keyway slots therein, said third hinge plate connected in hinged relation to said first and second hinge plates by a pivot pin, said pivot pin having a longitudinal axis, a centrally disposed annular hub portion, first and second shoulder portions extending in opposite axial directions from said hub portion, toward but not extending to first and second ends, said first, third and second openings being aligned with one another so as to respectively receive in close-fitting operative engagement one each of said first shoulder portion, said annular hub portion and said second shoulder portion, said method comprising the steps of:

placing said pivot pin into said first hinge plate such that said first shoulder portion is received by said first opening;

placing said third hinge plate over said first hinge plate such that said annular hub portion is received by said third opening;

placing said second hinge plate over said third hinge plate such that said second shoulder portion is received by said second opening;

said shoulder portions each having an amount of plastically deformable pin material;

correctly axially positioning said pivot pin at a predetermined longitudinal position within said openings with said amount of plastically deformable shoulder material adjacent the respective ones of said first and second openings;

plastically deforming said shoulder material, only, into said keyway slots in rotationally interfering register between said pivot pin and said first and second hinge plates, whereby said pivot pin is rotationally fixed relative to said first and second hinge plates and said pivot pin is axially fixed in opposite axial directions relative to said first and second hinge plates.

11. The method of claim 10, where at least some of said amount of said plastically deformable shoulder material is disposed outside one of said first and second openings and is generally juxtaposed with the respective said outer surface of said one of said first and second hinge plates.

* * * * *